(12) United States Patent
Schulte et al.

(10) Patent No.: US 9,139,078 B2
(45) Date of Patent: Sep. 22, 2015

(54) INTEGRATED HYDRAULIC SUPPLY PUMP

(75) Inventors: Jurgen Schulte, San Diego, CA (US);
Filippo Muggeo, Endwell, NY (US);
Derek Matthws, Vestal, NY (US);
Brendan Pancheri, Milwaukee, WI (US)

(73) Assignee: BAE SYSTEMS CONTROLS, INC., Endicott, NY (US)

( * ) Notice: Subject to any disclaimer, the term of this patent is extended or adjusted under 35 U.S.C. 154(b) by 488 days.

(21) Appl. No.: 13/601,947

(22) Filed: Aug. 31, 2012

(65) Prior Publication Data

US 2014/0060019 A1    Mar. 6, 2014

(51) Int. Cl.
| | | |
|---|---|---|
| *B60K 6/547* | (2007.10) | |
| *B60W 10/30* | (2006.01) | |
| *B60K 6/48* | (2007.10) | |
| *F16H 61/00* | (2006.01) | |
| *B60W 20/00* | (2006.01) | |
| *B60W 10/02* | (2006.01) | |

(52) U.S. Cl.
CPC . *B60K 6/547* (2013.01); *B60K 6/48* (2013.01); *B60W 10/30* (2013.01); *F16H 61/0031* (2013.01); *B60W 10/023* (2013.01); *B60W 10/026* (2013.01); *B60W 20/00* (2013.01); *B60W 2710/1083* (2013.01); *Y02T 10/6221* (2013.01)

(58) Field of Classification Search
CPC ............ B60K 2006/4808; B60K 6/54; B60W 2710/1083; B60W 10/026; B60W 10/023; F16H 61/0031
USPC .......................................................... 60/428
See application file for complete search history.

(56) References Cited

U.S. PATENT DOCUMENTS

| 3,527,186 A | 9/1970 | Wennberg |
|---|---|---|
| 3,700,060 A | 10/1972 | Keene et al. |

(Continued)

FOREIGN PATENT DOCUMENTS

| EP | 1 806 521 A1 | 7/2007 |
|---|---|---|
| WO | WO 97/43140 | 11/1997 |
| WO | WO 2012/034031 A2 | 8/2012 |

OTHER PUBLICATIONS

International Search Report and Written Opinion dated Dec. 4, 2013 from related International Application No. PCT/US2013/057181.

(Continued)

*Primary Examiner* — Thomas E Lazo
(74) *Attorney, Agent, or Firm* — Scully, Scott, Murphy & Presser P.C.

(57) ABSTRACT

A hybrid electric drive system including a hydraulic power system for a hybrid powered vehicle which includes a transmission, and a combustion engine and an electric motor both mechanically coupled to the transmission to provide engine and/or motor drive power for the vehicle. A plurality of hydraulic circuits communicate with an electrically driven hydraulic pump. The hydraulic pump is configured to provide fluid circulation to the plurality of hydraulic circuits. The hydraulic circuits are each connected to the transmission and other corresponding vehicle components. An electrical power supply is configured to power the electrically driven hydraulic pump, and the electrical power supply is electrically communicating with a rechargeable high voltage (HV) battery system. The electrically driven hydraulic pump communicates with the plurality of hydraulic circuits to provide fluid pressure in the hydraulic circuits.

18 Claims, 3 Drawing Sheets

(56) References Cited

U.S. PATENT DOCUMENTS

| | | | |
|---|---|---|---|
| 4,753,078 | A | 6/1988 | Gardner, Jr. |
| 5,473,990 | A | 12/1995 | Anderson et al. |
| 5,607,027 | A | 3/1997 | Puett, Jr. |
| 5,704,446 | A | 1/1998 | Chandy et al. |
| 5,715,664 | A | 2/1998 | Sallstrom et al. |
| 6,769,502 | B2 * | 8/2004 | Nakamori et al. ......... 180/65.25 |
| 7,465,250 | B2 | 12/2008 | Tamai et al. |
| 7,503,418 | B2 | 3/2009 | Mann |
| 7,516,613 | B2 | 4/2009 | Kadlicko |
| 7,972,239 | B2 * | 7/2011 | Imediegwu ....................... 477/2 |
| 2002/0155912 | A1 | 10/2002 | Saarinen et al. |
| 2003/0035734 | A1 | 2/2003 | Vukovich et al. |
| 2009/0038305 | A1 | 2/2009 | Stehr et al. |
| 2009/0203497 | A1 | 8/2009 | Imediegwu |
| 2009/0236156 | A1 | 9/2009 | Promersberger et al. |
| 2009/0255741 | A1 * | 10/2009 | Major et al. ............... 180/65.22 |
| 2009/0257887 | A1 | 10/2009 | Beattie |

OTHER PUBLICATIONS

English language Abstract of DE 102004040315 (A1), Aug. 20, 2004.

* cited by examiner

INTEGRATED HYDRAULIC SUPPLY PUMP

FIELD OF THE INVENTION

The present invention generally relates to a hydraulic system for a hybrid powered vehicle which includes a plurality of hydraulic circuits communicating with an electrically driven hydraulic pump.

BACKGROUND OF THE INVENTION

In the area of automotive technology, including hybrid vehicles, vehicles with hydraulic systems for vehicle components include a mechanical connection to an engine. For example, vehicles with automatic transmissions rely on engine rotation, at a minimum speed, to provide power to an internal pump of the transmission to provide hydraulic pressure to transmission clutches, and additionally to cool transmission components. In this system the engine is mechanically connected to the transmission.

Referring to FIG. 1, a prior art power system 10 for a hybrid vehicle 60 includes an engine 12 which is connected to a torque converter 14 which in turn is connected to an automatic transmission 16. The engine 12 is connected to the torque converter 14 and the transmission 16, and the transmission pump 18 via mechanical linkage 15. An electronic control module (ECM) 20 communicates with the automatic transmission 16 for electrically controlling the automatic transmission 16. The ECM also may communicate with other system of the vehicle, alone or in combination, for example, the engine, automatic braking system (ABS), power take off (PTO), and body controller. The ECM 20 may be powered by, the vehicle low voltage electrical system (battery and/or alternator) and/or electrical system 50 of a hybrid powered vehicle 60. A transmission pump 18 is located within the transmission 16. The internal transmission pump 18 supplies the automatic transmission 16 and the torque converter 14 with transmission fluid flow and maintains fluid pressure. The internal transmission pump 18 is coupled to the power steering pump 22 as the engine may drive both the internal transmission pump 18 and the power steering pump 22 as designated by linkage 15. The power steering pump 22 may be connected via a hydraulic hose 24 (alternatively a high pressure hose may be used) for hydraulic fluid transfer, to a steering fluid reservoir 30. The power steering pump 22 is also connected to a steering gear 26 via the hydraulic hose 24. Likewise the hydraulic hose 24 connects the steering gear 26 to the steering fluid reservoir 30. The steering gear 26 and pump 22 are connected to, and dependent on, the engine for engine rotation to drive the pump 22, for example, one or more belts to drive the pump using engine rotation. A disadvantage of the above hydraulic system is that the engine 12 needs to rotate in order for the hydraulic pumps to function. Also, the engine may need to maintain a threshold speed (revolutions per minute (RPM)) to maintain adequate fluid pressure in a hydraulic circuit, or the engine may need to maintain a higher RPM during maximum load in a hydraulic circuit. Thus, in the system 10, the automatic transmission 16 relies on engine rotation to provide power to the internal transmission pump 18 to provide hydraulic pressure to its clutches and additionally to lubricate and cool transmission components. Similarly, the system 10 uses engine rotation to provide power to the power steering pump 22.

Other vehicle hydraulic systems may use an electric hydraulic pump for supplying transmission fluid. In one instance, a vehicle hydraulic system may include two hydraulic pumps, one mechanically coupled to an engine, and the second electrically coupled to a source of electric energy, wherein both pumps provide fluid pressure to the transmission. In another example, a vehicle hydraulic system may include a pump powered either by electric motor or engine for providing fluid pressure to the transmission only. However, one disadvantage of the above systems is that they include mechanical connection to the engine, as they rely on engine rotation to power the pump. Another disadvantage with known systems includes that one or more pumps are used for each vehicle component, for example, the transmission, and the pump is typically located inside the transmission housing which may be difficult to access when servicing the pump.

Therefore, a need exists for a hydraulic system that can provide fluid pressure to a hydraulic circuit when an engine is idling at a low RPM or off. It would further be advantageous for the hydraulic system to provide the above while increasing the ease of maintenance of the hydraulic pump.

SUMMARY OF THE INVENTION

The present invention includes an integrated hydraulic supply system which may supply power steering fluid pressure, transmission lubrication and cooling, and hydraulic pressure for automated clutches.

In an aspect of the invention, a hybrid electric drive system includes a hydraulic power system for a hybrid powered vehicle which includes a transmission, and a combustion engine and an electric motor both mechanically coupled to the transmission to provide engine and/or motor drive power for the vehicle. A plurality of hydraulic circuits communicate with an electrically driven hydraulic pump. The hydraulic pump is configured to provide fluid circulation to the plurality of hydraulic circuits. The hydraulic circuits are each connected to the transmission and other corresponding vehicle components. An electrical power supply is configured to power the electrically driven hydraulic pump, and the electrical power supply is electrically communicating with a rechargeable high voltage (HV) battery system. The electrically driven hydraulic pump communicates with the plurality of hydraulic circuits to provide fluid pressure in the hydraulic circuits.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
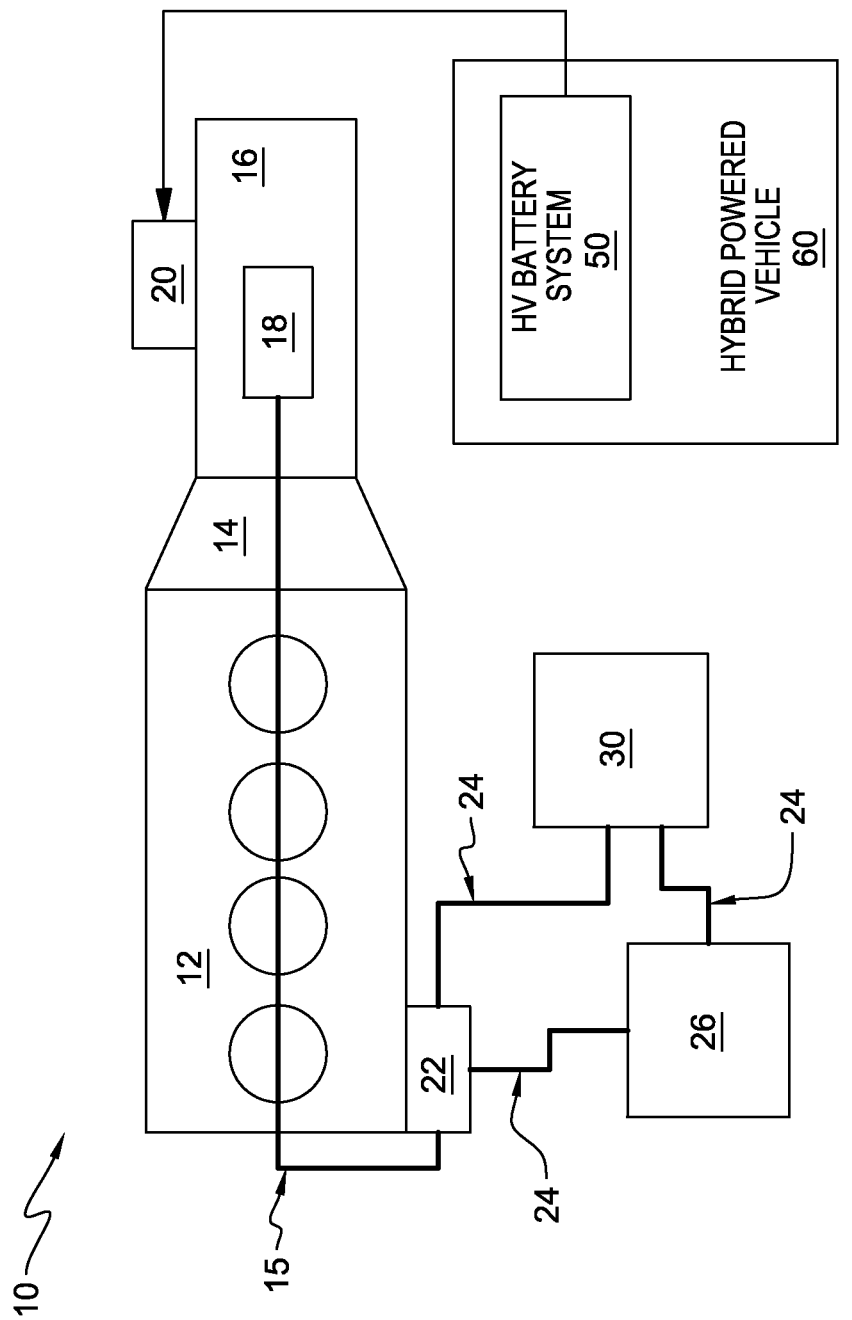
FIG. 1 is a schematic block diagram of a prior art hydraulic system for a hybrid powered vehicle including transmission and power steering hydraulic circuits connected to an engine.
Figure 2:
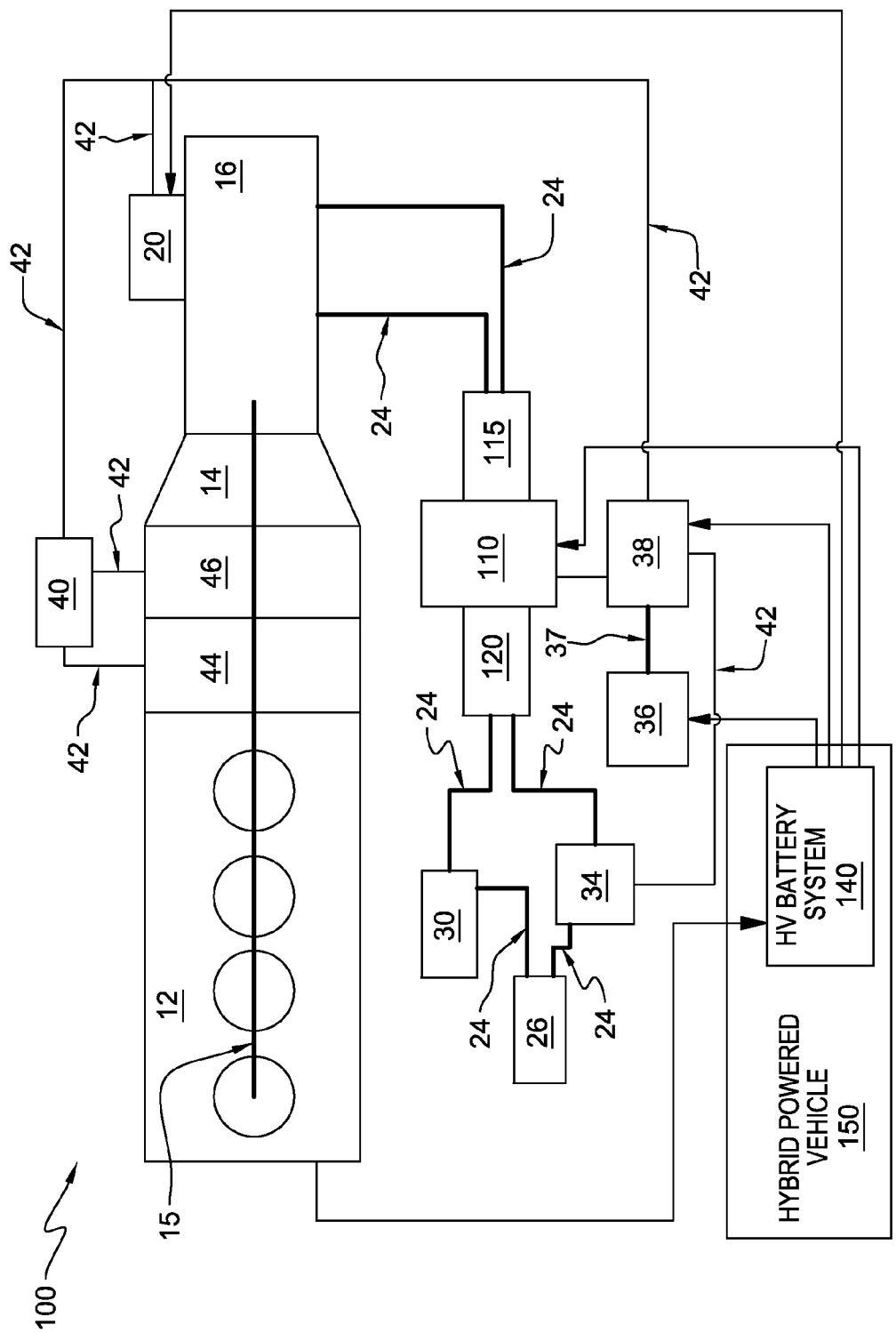
FIG. 2 is a schematic block diagram of a hydraulic system for a hybrid powered vehicle according to an embodiment of the invention including a transmission and power steering hydraulic circuits connected to an electric motor.

Referring to FIG. 2, an integrated hydraulic system 100 according to an embodiment of the invention is shown, for a hybrid powered vehicle 150. Similar components as in the system 10 shown in FIG. 1 have the same reference numerals. In contrast to the system in FIG. 1, the integrated hydraulic system 100 includes an electric motor 110 which may be connected to and driving one or more hydraulic units, individually or in combination, for example, an electrically driven power steering pump 120 and an electrically driven transmission fluid pump 115. The power steering pump 120 supplies fluid to a vehicle component embodied as a power steering unit depicted as the steering gear 26 via the hydraulic hoses 24 shown in FIG. 2. Alternatively, a connection between the power steering pump and a component could be hard piped. The power steering pump 120 supplies fluid via a steering fluid reservoir 30 using hydraulic hoses 24 which form a hydraulic circuit for the power steering. The transmission fluid pump 115 supplies fluid to the automatic transmission 16 and the torque converter 14 via the hydraulic hose or hoses 24 for transmission actuation, lubrication and cooling, and low pressure transmission fluid is supplied to the fluid pump 115, which forms a hydraulic circuit for the transmission. The transmission 16 may incorporate a low pressure reservoir, or it may be a separate component. The electric motor 110 is connected to a rechargeable high voltage (HV) battery system 140 of the hybrid powered vehicle 150. In the hybrid powered vehicle 150, the HV battery system is charged by the secondary launch device 46 which is driven as a generator in a vehicle regeneration mode when the vehicle is braking or slowing down, or when the engine 12 drives the secondary launch device 46 as a generator. In an alternative embodiment, a low voltage (for example, <42 Vdc) battery system may be used.

Alternative embodiments may use hydraulic hoses which are considered high or low high pressure fluid hoses, or not considered to fit in either of these categories. The embodiment of the present disclosure is describing one such embodiment, but not limited to high or low pressure fluid hoses.

In the embodiment of the invention of the integrated hydraulic system 100 shown in FIG. 2, the transmission pump 115 and the power steering pump 120 are physically separate from the transmission and the engine, respectively, however, the transmission pump 115 remains in fluid contact with the transmission. Further, the transmission pump 115 and power steering pump 120 may be adjacent or in physical contact with the electric motor 110 as shown in FIG. 2. The transmission pump 115 and the power steering pump 120 of the integrated hydraulic system 100 are not driven by the engine, i.e., engine rotation as in the system shown in FIG. 1. The transmission pump 115 and the power steering pump 120 of the integrated hydraulic system 100 are driven by the electric motor 110.

In an alternative embodiment, an internal pump to the transmission may be utilized in addition to the power steering pump 120, wherein the internal pump may have a reduced size. In this scenario, the external pump may be less expensive as it would only be sized for operation at zero speed, in low flow capacity.

Thereby, the integrated hydraulic system 100 eliminates the mechanical connection using linkage 15 between the power steering pump 120 and the transmission pump 18 positioned inside the transmission 16, in system 10 shown in FIG. 1. The mechanical linkage 15 in the system 100 shown in FIG. 2, connects the engine 12, optional mechanical disconnect 44, the optional secondary launch device 46, the torque converter 14, and the transmission 16. As in the system 10 shown in FIG. 1, an electronic control module (ECM) 20 communicates with the automatic transmission 16 for electrically controlling the automatic transmission 16.

As shown in FIG. 2, the power steering pump 120 and transmission pump 115 are connected via hydraulic hoses 24 for hydraulic fluid transfer to the transmission, and to the steering fluid reservoir 30. The power steering pump 120 is also connected to the steering gear 26 via a series of hydraulic hoses 24, and a pressure sensor 34 is between the steering gear 26 and the power steering pump 120. In the system 100, a measurement device such as the pressure senor provides a feedback signal for control of the hydraulic circuit. A flow sensor may also be used as a measurement device. The pressure sensor 34 is optional in the system 100. Likewise the hydraulic hose 24 connects the steering gear 26 to the steering fluid reservoir 30. Thereby, the embodiment of the present invention combines multiple hydraulic systems, i.e., the power steering pump, and the transmission pump, into the integrated hydraulic system 100. The integrated hydraulic system 100 provides a hydraulic supply center using a single electric power supply 110 to provide fluid pressure to the various components, as shown in FIG. 2, embodied as the automatic transmission 16, and the power steering gear 26.

Other optional equipment includes an energy source 36 which may include an air compressor, a hydraulic accumulator, or a battery. Another optional piece of equipment includes a motor controller 38 connected to the energy source 36 via a mechanical linkage 37, or via an electrical connection. The motor controller 38 may also be communicatively connected to the pressure sensor 34 via communication path 42. An optional launch controller 40 communicates with the motor controller 38 via another communication path 42. The launch controller 40 is connected to an optional secondary launch device 46 and an optional mechanical disconnect 44, via communication paths 42.

In an alternative embodiment, a conventional vehicle with engine start/stop technology could be provided by removing the HV system 140 and the optional components including, the launch controller 40, the mechanical disconnect 44, and secondary launch device 46, wherein the energy source 36 and the motor controller 38 would be used to power the system.

The system 100 may operate at a continuous speed using the electric motor 110, without controls necessary when the pump is driven by a transmission as in the system 10 of FIG. 1. Further, the system 100 of the present disclosure may be operated with transmission ECM 20 communication only, as opposed to the additional mechanical communication of mechanical linkage 15 of the system 10 shown in FIG. 1. In the integrated system 100, the electric motor 110 may operate at a minimum speed to supply steering gear fluid flow, or alternatively, operate when a sensor detects that there is movement of the steering column. Further, the electric motor 110 speed may be optimized based on transmission flow demands, vehicle velocity, current gear ratio, etc. The motor 110 speed may be further optimized with the additional sensor 34 in the steering loop (including steering pump 120, steering fluid reservoir 30, steering gear 26) to deliver power on demand when indicated by the sensor 34.

The hydraulic power system 100 may include the combustion engine 12 being powered off, while the electrical power supply 36 and/or 140 provides an output voltage to drive the hydraulic pumps 120, 115. Alternatively, the engine 12 may be maintained at a specified speed such as an idle speed, or other engine speed or RPM to maximize fuel efficiency, and charge the battery system(s). The engine may charge both a high voltage system and a low voltage system (for example, <42V), and either could be used to drive the electric motor 110. Alternatively, in the system 100 shown in FIG. 2, the combustion engine 12 may be adapted to additionally provide power to a drive system (not shown) for the hybrid powered vehicle 150, in addition to charging the battery system(s) 140.

The electric motor 110 may be designed to accept pumps on either end of the motor, such as the power steering pump 120 and transmission pump 115 as shown in FIG. 2, or for example, with a single output and two pumps in series. Moreover, the electric motor 110 may also power other vehicle units for other vehicle systems, for example, an air compressor, alternator, A/C (air conditioner) compressor, or a water pump. Alternatively, pumps may be in a row, such as, a power steering pump mounted on the back of an Air Brake Compressor.

Alternatively, the system 100 shown in FIG. 2 may include the transmission hydraulic circuit having a first hydraulic pressure, and a second hydraulic pressure where the first hydraulic pressure is greater than the second hydraulic pressure. The first hydraulic pressure may be maintained when the transmission is shifting, and the second hydraulic pressure may be maintained when the transmission is not shifting. For example, the engine and transmission may both have pumps which are reduced in size, and an additional electric system pump can be sized to assist the main mechanical pumps for short transient loads, or operate to maintain function of the system when the engine is off. The reduced mechanical pumps save fuel, while a small electrically operated pump can handles the times when more flow or pressure is needed than the mechanical pump(s) can supply.

Figure 3:
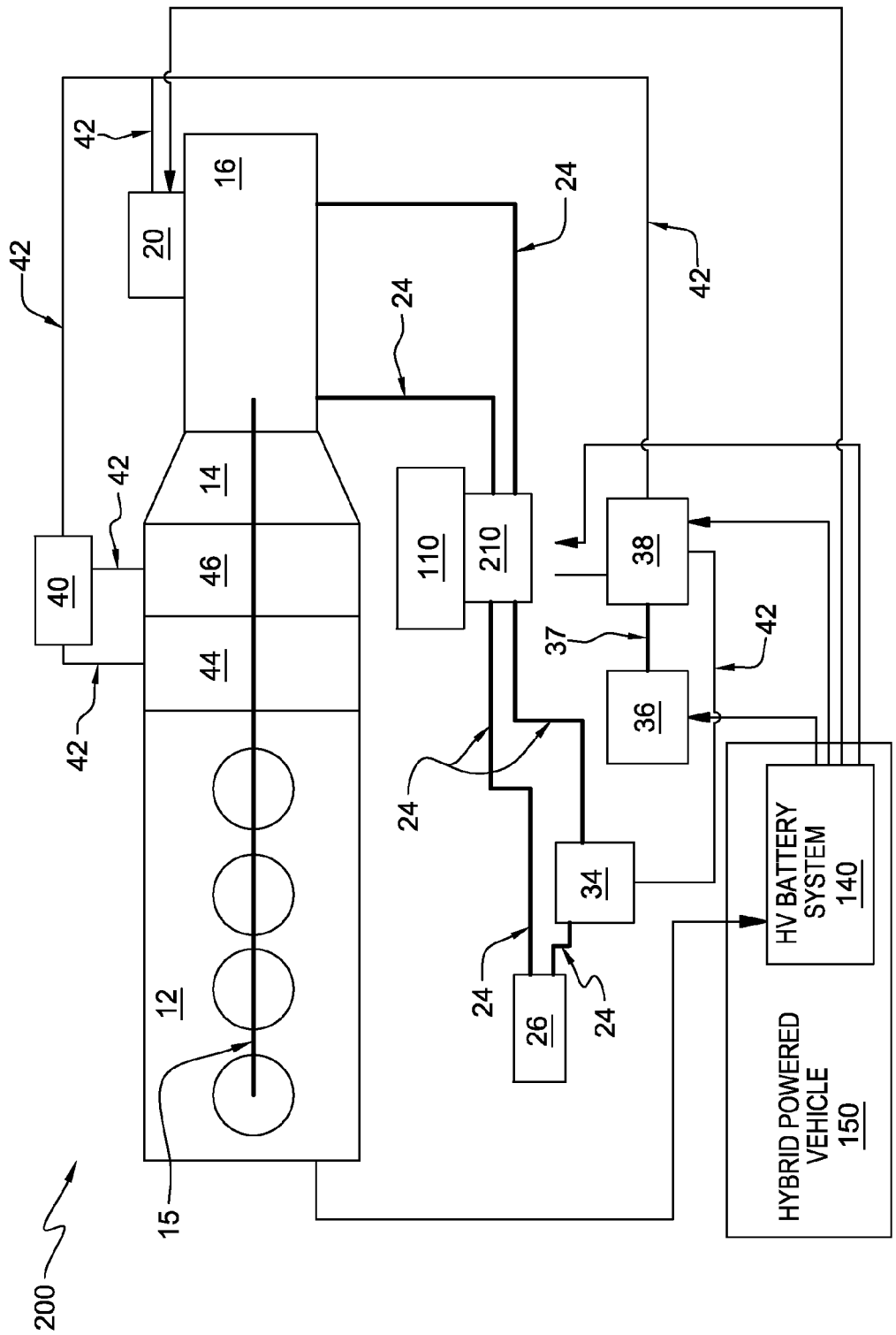
FIG. 3 is a schematic block diagram of another embodiment of the invention similar to the embodiment shown in FIG. 2, however only one fluid pump is used in the hydraulic system.

Additionally, the system 200, shown in FIG. 3, includes the electrical power supply, e.g., the HV battery system 140 providing an output voltage of the electrical power supply unrelated to an engine speed.

Referring to FIG. 3, in an alternative embodiment of the invention is shown where like elements shown in FIG. 2 have the same reference numerals, a hydraulic power system 200 for a hybrid powered vehicle may include a singular electrically driven hydraulic pump 210 using electric motor 110, for powering multiple hydraulic circuits. Similar to the embodiment of the system 100 shown in FIG. 2, the singular electrically driven hydraulic pump 210 is powered by an electrical power supply, for example, the electric motor 110 electrically communicating with the HV battery system 140. Alternatively, electric motor 110 may not be driven by a HV battery, but could be driven by a low voltage link, e.g. <42 Vdc. The singular electrically driven hydraulic pump 210 communicates with the plurality of hydraulic circuits to provide fluid pressure in the hydraulic circuits communicating with the transmission 16 and the power steering gear 26. One advantages of the integrated system of the present disclosure is that the several vehicle fluid or hydraulic circuits are combined into one fluid or hydraulic circuit.

The present invention as described above in the integrated hydraulic systems 100, 200 combines both the transmission pump 115 and cooling function into one circuit using hydraulic hoses 24, utilizing one electrically driven pump 110. The use of the transmission pump 115 externally to the transmission 16 has benefits which include higher efficiency, because fluid flow is provided at a continuous flow rate by the pump 115, which does not depend on the engine speed. Further, the engine 12 can be shut down when at idle, because the externally positioned transmission pump 115 is driven by the electric motor 110. Engine idle shutdown improves vehicle fuel consumption, and also prevents unnecessary losses in the torque converter during vehicle stops. Additionally, the systems 100 and 200 provide easier maintenance since essential components are removed from the inside of the transmission, thus providing ease of access to the transmission pump 115 and the power steering pump 120. Moreover, the electric motor 110, power steering pump 120, and transmission pump 115 combination of the systems 100 and 200 may also include providing hydraulic pressure for a torque converter with optional lock up device or a clutch 14, via the fluid hoses Other advantages of both the systems 100 and 200 of the present disclosure is that transmission operation and steering is possible without engine operation. Further, lower energy consumption is possible due to optimized flow control using the electric motor 110. Additionally, when the secondary launch device 46, and the mechanical disconnect 44 are used, launch is possible with a locked torque converter 14 which improves launch efficiency.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A hybrid electric drive system for a hybrid powered vehicle, comprising:
   a transmission;
   a combustion engine and a first electric motor both mechanically coupled to the transmission to provide engine and/or motor drive power for the vehicle, and a rechargeable high voltage battery system coupled to the first electric motor;
   a plurality of hydraulic circuits communicating with an electrically driven hydraulic pump, the hydraulic pump being configured to provide fluid circulation to the plurality of hydraulic circuits, a first circuit of the plurality of hydraulic circuits being connected to the transmission and each of the other hydraulic circuits of the plurality of hydraulic circuits being connected to corresponding other vehicle components, respectively;
   a second electric motor configured to power the electrically driven hydraulic pump, the second electric motor electrically communicating with the rechargeable high voltage battery system and the electrically driven hydraulic pump to provide fluid pressure in the hydraulic circuits,
   wherein the first hydraulic circuit is configured to maintain a first hydraulic pressure and a second hydraulic pressure wherein the first hydraulic pressure is greater than the second hydraulic pressure, and the first hydraulic pressure is initiated and maintained when the transmission is shifting and the second hydraulic pressure is initiated and maintained when the transmission is not shifting.

2. The hybrid electric drive system of claim 1, wherein the electrically driven
   hydraulic pump is driven independently of the combustion engine.

3. The hybrid electric drive system of claim 1, wherein:
   the first hydraulic circuit is communicating a first electrically driven pump; and
   a second hydraulic circuit is communicating with a second electrically driven pump, wherein both the first and second pumps are driven by the second electric motor, and each of the first and second pumps communicate with a corresponding one of the hydraulic circuits and are both remote from first and second vehicle components, respectively.

4. The hybrid electric drive system of claim 3, wherein the first hydraulic circuit includes a transmission pump connected to the transmission, and the second hydraulic circuit includes a power steering pump connected to a power steering unit.

5. The hybrid electric drive system of claim 4, wherein the first hydraulic circuit is configured for a first hydraulic pressure and the second hydraulic circuit is configured for a second hydraulic pressure.

6. The hybrid electric drive system of claim 1, wherein the hydraulic power system is configured such that the combustion engine includes a plurality of speeds including a threshold idle speed including a specified revolutions per minute (RPM), and the second electric motor provides an output voltage unrelated to the engine speed.

7. The hybrid electric drive system of claim 1, wherein the hydraulic power system is configured such that the combustion engine is powered off while the second electric motor provides an output voltage to drive the hydraulic pump.

8. The hybrid electric drive system of claim 7, wherein the second electric motor is powered by a low voltage battery unit.

9. The hybrid electric drive system of claim 1, further comprising:
a pressure sensor communicating with one of the hydraulic circuits.

10. The hybrid electric drive system of claim 1, further comprising:
a motor controller for controlling the second electric motor.

11. The hybrid electric drive system of claim 1, further comprising one or more of the following elements:
a launch controller connected to the first electric motor; and
a mechanical disconnect, the mechanical disconnect being connected between the combustion engine and the first electric motor.

12. The hybrid electric drive system of claim 1, wherein the hydraulic pump is remote from the vehicle components.

13. A method for providing hydraulic power to a hybrid powered vehicle, comprising:
connecting a plurality of hydraulic circuits to an electrically driven hydraulic pump, the hydraulic pump being configured to provide fluid circulation to the plurality of hydraulic circuits;
connecting the hydraulic circuits to corresponding vehicle components;
positioning the hydraulic pump remote from the vehicle components;
configuring an electrical power supply to power the electrically driven hydraulic pump; and
electrically connecting the electrical power supply with a rechargeable high voltage (HV) battery system and the electrically driven hydraulic pump to provide fluid pressure in the hydraulic circuits including the vehicle hydraulic pump;
wherein a first circuit of the plurality of hydraulic circuits being connected to a transmission, and
specifying a first hydraulic pressure and a second hydraulic pressure in the transmission wherein the first hydraulic pressure is greater than the second hydraulic pressure; and
maintaining the first hydraulic pressure when the transmission is shifting, and maintaining the second hydraulic pressure when the transmission is not shifting.

14. The method of claim 13, further comprising:
providing a first hydraulic circuit having a first electrically driven pump; and
providing a second hydraulic circuit having a second electrically driven pump, wherein both the first and second pumps are driven by the electrical power supply;
connecting each of the first and second pumps with a corresponding one of the hydraulic circuits; and
positioning both the first and second pumps remote from first and second vehicle components, respectively.

15. The method of claim 14, further comprising:
connecting a transmission pump connected to a transmission to the first hydraulic circuit, and connecting a power steering pump connected to a power steering unit to the second hydraulic circuit.

16. The method of claim 13, further comprising:
varying the speed of a combustion engine including maintaining a threshold idle speed including a first specified revolutions per minute (RPM), while providing an output voltage of the electrical power supply unrelated to the engine speed.

17. The method of claim 16, wherein the combustion engine is connected to a drive system of the hybrid powered vehicle for providing additional power, and the combustion engine is powered off while the electrical power supply provides an output voltage to drive the hydraulic pump.

18. A hydraulic power system for a hybrid powered vehicle, comprising:
a plurality of hydraulic circuits communicating with an electrically driven hydraulic pump, the hydraulic pump being configured to provide fluid circulation to the plurality of hydraulic circuits, the hydraulic circuits each being connected to corresponding vehicle components;
the plurality of hydraulic circuits including:
a first hydraulic circuit having a first electrically driven pump, wherein the first hydraulic circuit includes a transmission pump connected to a transmission; and
a second hydraulic circuit having a second electrically driven pump, wherein the second hydraulic system includes a power steering pump connected to a power steering unit, both the first and second pumps are driven by the electrical power supply, and each of the first and second pumps are remote from their respective vehicle components, respectively; and
an electrical power supply configured to power the electrically driven hydraulic pump, the electrical power supply electrically communicating with a rechargeable high voltage (HV) battery system, and the electrically driven hydraulic pump communicating with the plurality of hydraulic circuits to provide fluid pressure in the hydraulic circuits;
wherein the first hydraulic circuit is configured to maintain a first hydraulic pressure and a second hydraulic pressure wherein the first hydraulic pressure is greater than the second hydraulic pressure, and the first hydraulic pressure is initiated and maintained when the transmission is shifting and the second hydraulic pressure is initiated and maintained when the transmission is not shifting.

\* \* \* \* \*